US012131485B2

(12) United States Patent
Takahashi

(10) Patent No.: US 12,131,485 B2
(45) Date of Patent: Oct. 29, 2024

(54) OBJECT TRACKING DEVICE AND OBJECT TRACKING METHOD

(71) Applicant: OMRON Corporation, Kyoto (JP)

(72) Inventor: Shinji Takahashi, Kyoto (JP)

(73) Assignee: OMRON CORPORATION, Kyoto (JP)

(*) Notice: Subject to any disclaimer, the term of this patent is extended or adjusted under 35 U.S.C. 154(b) by 392 days.

(21) Appl. No.: 17/770,980

(22) PCT Filed: Sep. 23, 2020

(86) PCT No.: PCT/JP2020/035705
§ 371 (c)(1),
(2) Date: Apr. 21, 2022

(87) PCT Pub. No.: WO2021/084972
PCT Pub. Date: May 6, 2021

(65) Prior Publication Data
US 2022/0366570 A1 Nov. 17, 2022

(30) Foreign Application Priority Data
Oct. 29, 2019 (JP) ................... 2019-196281

(51) Int. Cl.
G06T 7/215 (2017.01)
G06T 7/11 (2017.01)

(52) U.S. Cl.
CPC ............. G06T 7/215 (2017.01); G06T 7/11 (2017.01); G06T 2207/10016 (2013.01)

(58) Field of Classification Search
CPC . G06T 7/215; G06T 7/11; G06T 2207/10016; G06T 2207/10024;
(Continued)

(56) References Cited

U.S. PATENT DOCUMENTS

2009/0304231 A1* 12/2009 Lu .................. G06V 10/454
382/103

FOREIGN PATENT DOCUMENTS

JP 2014036429 A 2/2014
JP 2016110656 A 6/2016
(Continued)

OTHER PUBLICATIONS

International Search Report issued in Intl. Appln. No. PCT/JP2020/035705 mailed Dec. 15, 2020. English translation provided.
(Continued)

Primary Examiner — Christopher Wait
(74) Attorney, Agent, or Firm — ROSSI, KIMMS & McDOWELL LLP

(57) ABSTRACT

An object tracking device stores, for each site of an object, information indicating an area image of the object in a first frame image of frame images included in a moving image, and stores a conspicuous site of the object. In response to the object being lost, for each maximum value position in a conspicuity map for a second frame image with the lost object, a recovery unit in the object tracking device (1) estimates an area with each site of the object when the conspicuous site is hypothetically at the maximum value position and (2) calculates a similarity score based on a similarity between the area image of each site in the first frame image and the area image of each site in the second frame image, and determines that the object is at a maximum value position in the second frame image with a maximum similarity score.

14 Claims, 10 Drawing Sheets

(58) Field of Classification Search
CPC . G06T 2207/30196; G06T 2207/30232; G06T 7/248; G06T 7/20; H04N 23/698; H04N 7/183; H04N 7/18; H04N 23/00; H04N 23/60

See application file for complete search history.

(56) References Cited

FOREIGN PATENT DOCUMENTS

| | | |
|---|---|---|
| JP | 2018077807 A | 5/2018 |
| WO | 2015163830 A1 | 10/2015 |

OTHER PUBLICATIONS

Written Opinion issued in Intl. Appln. No. PCT/JP2020/035705 mailed Dec. 15, 2020. English translation provided.

\* cited by examiner

FIG. 3

| Head center position | Upper half center position | Lower half center position | Head size | Upper half size | Lower half size | Head visible rate | Upper half visible rate | Lower half visible rate |
|---|---|---|---|---|---|---|---|---|
| (x1, y1) | (x2, y2) | (x3, y3) | (w1, h1) | (w2, h2) | (w3, h3) | 100% | 50% | 30% |
| ... | ... | ... | ... | ... | ... | ... | ... | ... |

300

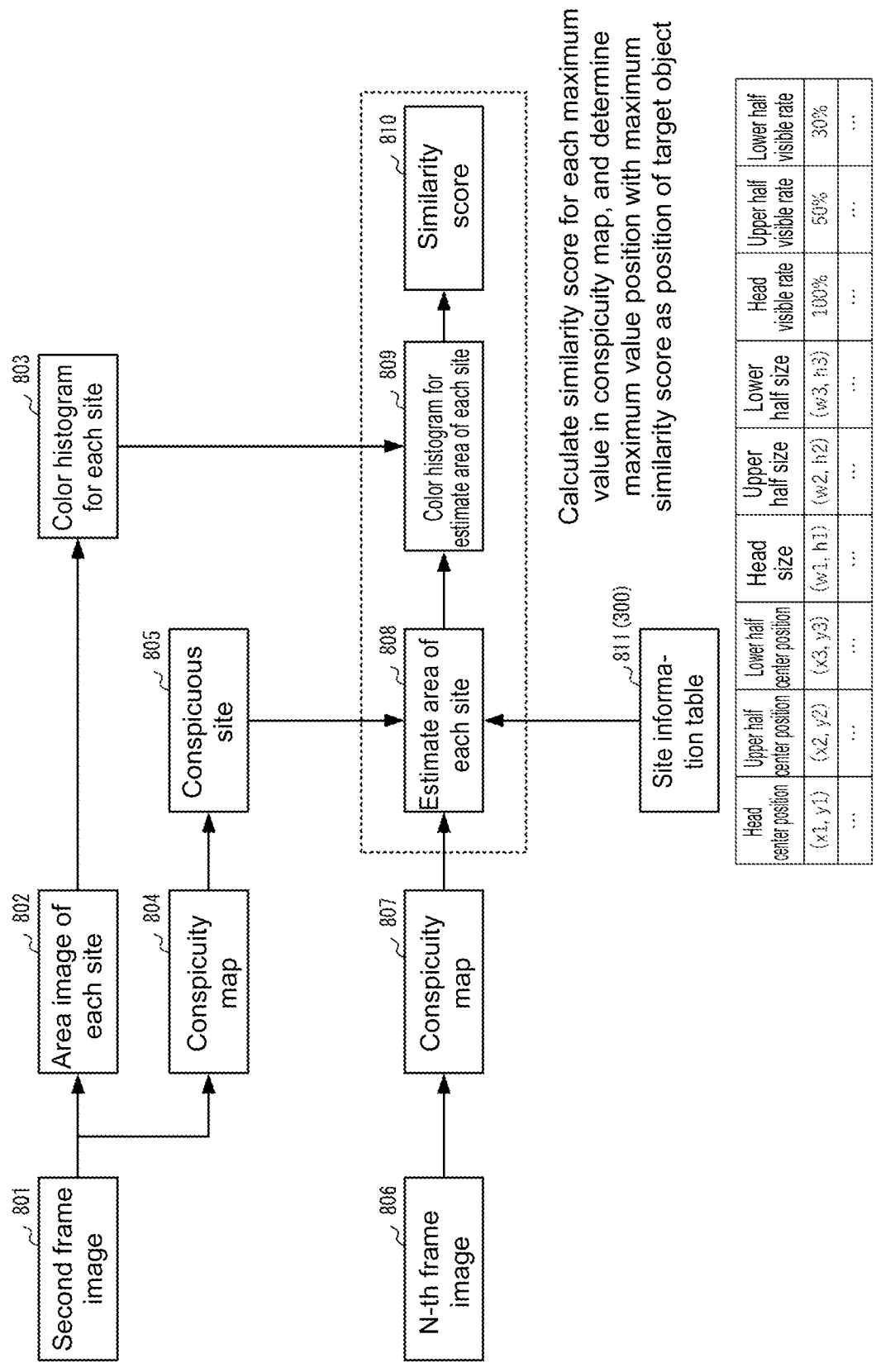

Area images of sites in second frame and color histograms for area images

Conspicuity map for second frame

Conspicuity map for each site in N-th frame

Estimate area of each site in N-th frame

OBJECT TRACKING DEVICE AND OBJECT TRACKING METHOD

FIELD

The present invention relates to a technique for recovering from an object track loss.

BACKGROUND

Object tracking, or tracking of an object detected in a frame in moving images (time-series images), is a notable technique in the field of computer vision.

One known example of the object tracking method is a kernelized correlation filter (KCF) in a correlation filter model. A KCF is used for tracking while determining a track target area provided first as being true in learning online. Over time, noise (an image area other than a track target) may occur in a track target area, and the track target may be drifted to the background. Such a failure in continuing normal tracking due to a loss of a track target is called a tracking failure or a track loss.

A track loss occurs with any tracking method other than tracking using a correlation filter model. In a track loss, the track target is to be searched for again to continue tracking. Searching for a track target again after a track loss and continuing tracking is called a tracking recovery.

Patent Literature 1 describes a process for recovering from a track loss. In the process in Patent Literature 1, a template image is continuously updated while tracking is being successful, whereas a search is performed using an initial template image in a track loss, and the search result is used as a track target to recover from the loss.

In the field of building automation (BA) or factory automation (FA), an application may be used to automatically measure, for example, the number, positions, or lines of flow of people with an image sensor to optimally control a device such as a light fixture or an air conditioner. For such use, a super wide-angle camera including a fisheye lens (referred to as a fisheye camera herein, and commonly also called an omnidirectional camera or a full 360-degree spherical camera) is frequently used to obtain image information over a widest possible range. For the above use, to obtain image information over a widest possible range, a camera is installed at a high place such as the ceiling to capture images from the top viewpoint. To capture images of a person, the installed camera captures a front, side, or rear view when the person is on the periphery of the image, and captures a top view when the person is at the center of the image. The installed camera captures images of the entire target object when the target object is on the periphery. However, in the top view captured when the target object is at the center, the trunk or the lower half of the body is hidden although images of the head or shoulders are captured.

In the images captured by a fisheye camera, the appearance of a target object is deformed due to distortion depending on the position in the captured plane. When a camera other than a fisheye camera is used, the appearance of a track target may also be deformed or hidden depending on the position of the track target in images captured by the camera from the top viewpoint. In an environment with a limited throughput such as in a built-in device, the frame rate may be low, and the amount of movement of an object between frames or the change in feature amount is large.

Thus, a known method such as the method described in Patent Literature 1 may not perform an accurate recovery.

CITATION LIST

Patent Literature

Patent Literature 1: Japanese Unexamined Patent Application Publication No. 2014-036429

SUMMARY

Technical Problem

In response to the above issue, one or more aspects of the present invention are directed to a technique for an object tracking recovery with higher accuracy than known techniques.

Solution to Problem

The object tracking device and the object tracking method according to one or more aspects of the present invention have the structure described below.

An object tracking device according to a first aspect of the present invention includes a storage, a tracker that tracks an object in a moving image, and a recovery unit that recovers the object in response to the object being lost. The storage stores, for each of sites of the object, information indicating an area image of the object in a first frame image of a plurality of frame images included in the moving image, and stores a site of the object with a maximum value in a conspicuity map for the first frame image. In response to the object being lost, for each maximum value position in a conspicuity map for a second frame image in which the object is lost, the recovery unit (1) estimates an area with each of the sites of the object when the site of the object with the maximum value in the first frame image is hypothetically at the maximum value position and (2) calculates a similarity score based on a similarity between the area image of each of the sites in the first frame image and the area image of each of the sites in the second frame image, and determines that the object is at a maximum value position in the second frame image with a maximum similarity score.

An object to be tracked, or simply an object, may be any of objects including a human body, a face, an animal, and a vehicle. An object may be divided into any number of sites appropriate for the object. For example, portions that can be conspicuous may be defined as sites. An object of a human body can be divided into three sites, a head, an upper half, and a lower half, but may be divided into more or less than three sites. Conspicuity is an index indicating the degree to receive attention from people, and can be determined based on features, such as brightness, a change in brightness over time, a color, or a direction.

The size or the shape of an object is assumed to be changed depending on the position in an image, but a site with maximum conspicuity (hereafter also referred to as a conspicuous site) usually remains unchanged. Thus, a maximum value position in a conspicuity map can be used as a candidate position of the conspicuous site. Under a condition that a specific site is at a specific position in an image, the positions of other sites in the image can also be determined. Thus, a recovery unit calculates a similarity score based on the similarity between an area image of each of the sites in a first frame image and an area image of each of the sites in a second frame image for each maximum value position in the conspicuity map, and determines that the object is at the position with a maximum similarity score. Thus, a recovery can be performed highly accurately irrespective of when the size or the shape of the object is changed in an image.

To perform such a recovery, a storage stores, for each site, information indicating an area image of an object in a first frame image, and stores, in advance, a site with maximum conspicuity (conspicuous site) in the first frame image. Information indicating an area image for each site may be any information that can be used to calculate the image similarity. For example, the information may be the area image, or the image feature amount indicating the feature of the area image. The conspicuous site is a site with a maximum value in the conspicuity map for the first frame image. When the object has multiple maximum values, a site at which the position with the greatest one of the multiple maximum values or the position obtained using the center of gravity or the weighted sum is located is determined as a conspicuous site.

The similarity of an area image for each site may be calculated based on, for example, the similarity of the image feature amount. Examples of the image feature amount include a color histogram and a luminance histogram. The final similarity score may be calculated by integrating the similarities of the image feature amount. Integration may include, for example, a weight corresponding to the visible rate of each of the sites in the second frame image. The image similarities may be integrated using different weights between the conspicuous site and other sites (hereafter also referred to as inconspicuous sites). Such calculation of the similarity score allows a more accurate recovery.

In an image including a site of an object at a specific position, any method may be used to obtain the position of another site of the object in the image. For example, the object may be photographed at various positions by actual measurement or simulation, and the positions of the respective sites of the object during measurement or simulation may be prestored. The object may be modeled into a specific shape (e.g., a cylinder), and an image of a specific site of the object captured at a specific position may be obtained as appropriate through calculation. In addition to the position of each site, the size or the shape of each site and the visible rate of each of the sites may be prestored or calculated as appropriate.

The first frame image may be any frame image preceding the second frame image, but may be an image close to a frame at the start of tracking of the object. Thus, the first frame image may be the frame image at the start of tracking of the object or the subsequent frame image. As the frame image is closer to a frame image in an initial stage of the start of tracking, the frame image includes less noise, and thus tracking is recovered more accurately.

A tracking algorithm used by the tracker in the present invention is not limited to a particular algorithm, and examples of the tracking algorithm include a method using a correlation filter such as the KCF, the minimum output of sum of squared error (MOSSE) filters, the discriminative correlation filters (DCF), the discriminant scale space tracker (DSST), the discriminative correlation filters with channel and spatial reliability (CSR-DCF), or Staple, and a method using mean-shift or template matching. In tracking using a correlation filter, the object can be determined as being lost when the maximum value of the index calculated by the correlation filter is less than a threshold. In mean-shift or template matching, the object can be determined as being lost when the index obtained by using, for example, a color histogram is outside an allowable range. More specifically, the object can be determined as being lost when the similarity used as an index is less than a threshold, or when the distance used as an index is greater than a threshold.

An image to be processed in the aspect of the present invention may be a fisheye image captured by a fisheye camera. The fisheye camera includes a fisheye lens and can capture super wide-angle images wider than images from a normal camera. An omnidirectional camera, a full 360-degree spherical camera, and a fisheye camera are example super wide-angle cameras and they are equivalent to one another. The fisheye camera may be installed to look down a detection target area from above the detection target area. Typically, the optical axis of the fisheye camera extends in the direction vertically downward, but may be inclined with respect to the vertical direction. The fisheye image has large distortion. Thus, in an image with a low frame rate, the feature of an object largely changes between frames, and the object is frequently drifted to the background. When the camera is installed to have its optical axis extending vertically downward, the viewpoint from which an object is photographed changes depending on the position of the object in the image. Thus, an image with a low frame rate may have the object deformed largely, a tracking failure occurring more frequently, and tracking recovered less easily. Irrespective of when the camera is installed to have its optical axis extending vertically downward, the aspect of the present invention allows a highly accurate recovery from a tracking failure using such a fisheye image. Instead of fisheye images, images processed in the aspect of the present invention may be normal images (images with less distortion or images with a high frame rate).

A track loss recovery method according to a second aspect of the present invention is a method implementable with an object tracking device in response to an object to be tracked being lost. The track loss recovery method includes storing, for each of sites of the object, information indicating an area image of the object in a first frame image of a plurality of frame images included in a moving image, storing a site of the object with a maximum value in a conspicuity map for the first frame image, in response to the object being lost, for each maximum value position in a conspicuity map for a second frame image in which the object is lost, (1) estimating an area with each of the sites of the object when the site of the object with the maximum value in the first frame image is hypothetically at the maximum value position, (2) calculating a similarity score based on a similarity between the area image for each of the sites in the first frame image and the area image for each of the sites in the second frame image, and determining that the object is at a maximum value position in the second frame image with a maximum similarity score.

One or more aspects of the present invention may be directed to an object tracking device including at least part of the above elements, an image processing device, or a monitoring system. One or more aspects of the present invention may be directed to an object tracking method including at least part of the above processes, an image processing method, or a monitoring method including at least part of the above processes, or to a program for implementing any of these methods or a non-transitory storage medium storing the program. The above elements and processes may be combined with one another in any manner to form one or more aspects of the present invention.

Advantageous Effects

The structure according to the above aspects of the present invention allows a more accurate recovery than with known techniques when a track target is lost.

BRIEF DESCRIPTION OF THE DRAWINGS

FIG. 3 is a site information table stored in a storage.

FIG. 8 is a data-flow diagram of a recovery process.

DETAILED DESCRIPTION

Example Use

Figure 1:
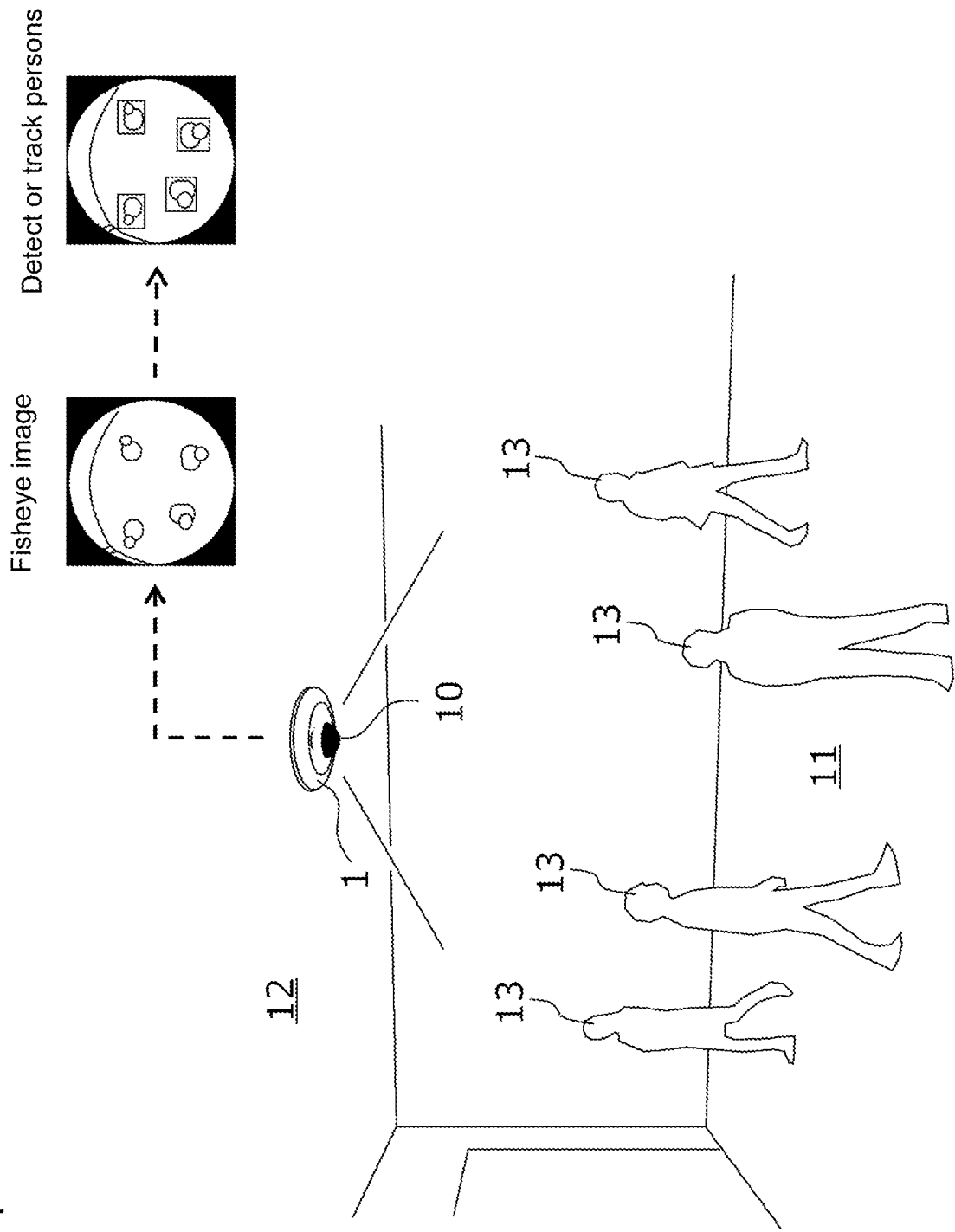
FIG. 1 is a diagram of an example use of a human tracking device according to one or more embodiments of the present invention.

With reference to FIG. 1, an example use of an object tracking device according to an embodiment of the present invention will be described. A human tracking device 1 analyzes a fisheye image captured by a fisheye camera 10 installed above a track target area 11 (e.g., on a ceiling 12) to detect or track persons 13 in the track target area 11. The human tracking device 1 detects, identifies, or tracks the persons 13 passing the track target area 11 in, for example, an office or a factory. In the example in FIG. 1, areas of the four human bodies detected in the fisheye image are indicated by bounding boxes. The detection result of the human tracking device 1 is output to an external device for use in, for example, counting the number of persons, controlling devices such as a light fixture or an air conditioner, monitoring a suspicious person, and analyzing the lines of flow.

In the example use, a tracking algorithm with local optimization is used as an object tracking algorithm. This algorithm causes tracking performed by learning an image of a partial area including a track target and identifying the position of the area having the features as the object. The vicinity of the object is also learned. Thus, when the background complexly changes, noise may occur over time, and the tracking may fail.

In the example use, tracking is recovered more accurately from a track loss. More specifically, the human tracking device 1 estimates a candidate area for each position with a maximum value in a conspicuity map, obtains the similarity score between the candidate area and the object, and estimates a maximum value position at which the similarity score is maximum as the position of the object. For an image including a specific site at a position, the human tracking device 1 obtains the positions of sites other than the specific site for each position on the image. Of these sites, the human tracking device 1 stores a site with the highest conspicuity (conspicuous site) during tracking. When a track is lost, the human tracking device 1 can estimate the presence of the conspicuous site at the maximum value position in the conspicuity map, and can estimate the positions of other sites. Thus, the human tracking device 1 can appropriately estimate the position of each site and calculates a final similarity score based on the similarity of the area of each site. The human tracking device 1 can thus perform a highly accurate recovery.

Monitoring System

Figure 2:
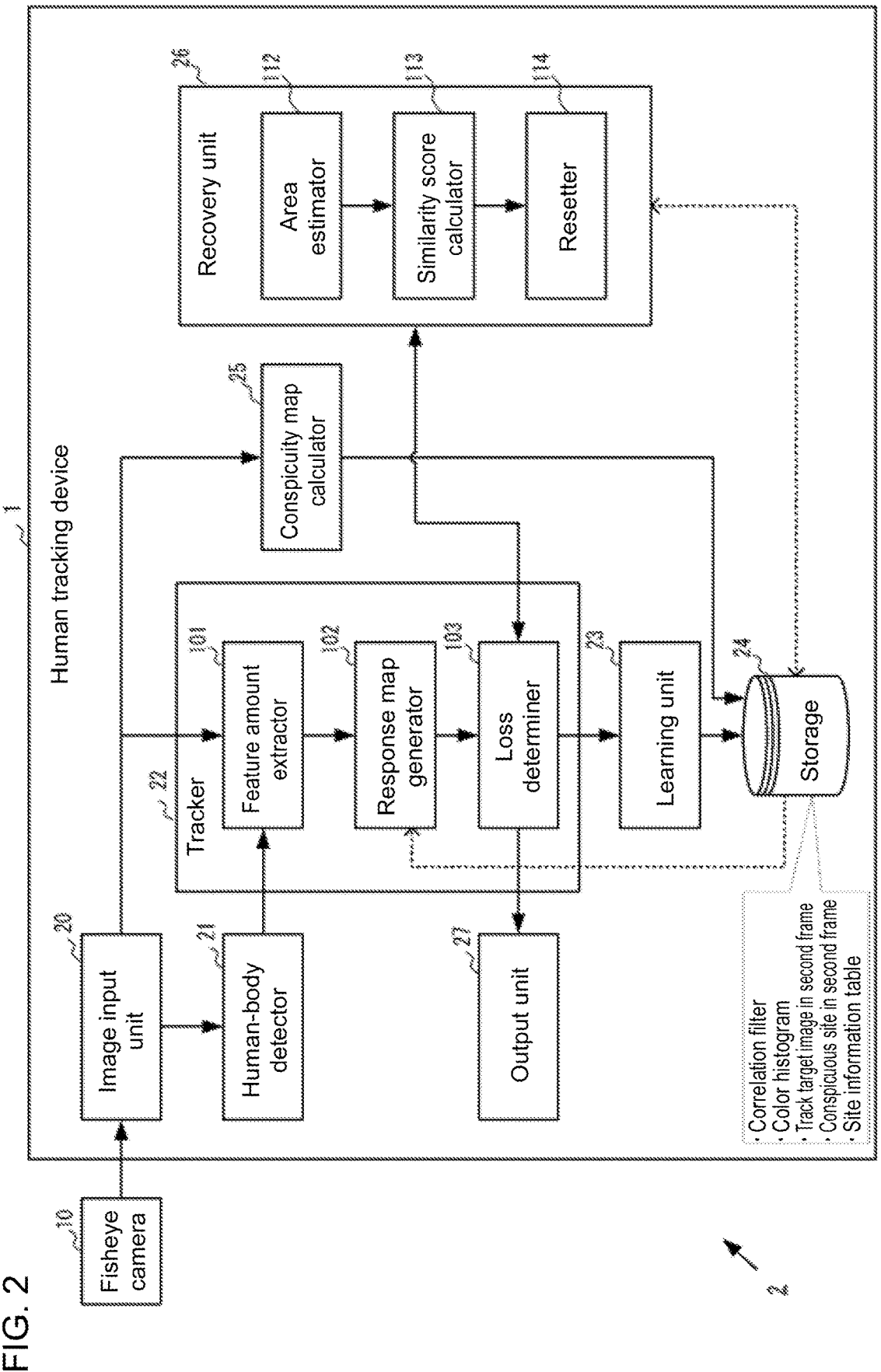
FIG. 2 is a block diagram of a monitoring system including a human tracking device.

One or more embodiments of the present invention will be described with reference to FIG. 2. FIG. 2 is a block diagram of a monitoring system including a human tracking device according to an embodiment of the present invention. A monitoring system 2 includes a fisheye camera 10 and the human tracking device 1.

Fisheye Camera

The fisheye camera 10 is an imaging device including an optical system including a fisheye lens and an image sensor, such as a charge-coupled device (CCD) or a complementary metal-oxide-semiconductor (CMOS). As shown in FIG. 1, for example, the fisheye camera 10 may be installed on the ceiling 12 of the track target area 11 while having its optical axis extending vertically downward, and capture omnidirectional (360-degree) images of the track target area 11. The fisheye camera 10 is connected to the human tracking device 1 with a wire, such as a universal serial bus (USB) cable or a local area network (LAN) cable, or wirelessly, for example, through Wi-Fi. Data of images captured by the fisheye camera 10 is input into the human tracking device 1. The image data may include either monochrome or color images, and may have any resolution or any frame rate, or may be in any format. In the present embodiment, color (RGB) images are captured at ten frames per second (10 fps).

Human Tracking Device

The human tracking device 1 includes, as hardware components, one or more processors, a main storage, an auxiliary storage, a communication device, an input device, and an output device. The processor executes a computer program to perform the processes described below. Part of or all the processes may be performed by a dedicated hardware circuit.

The human tracking device 1 according to the present embodiment includes an image input unit 20, a human-body detector 21, a tracker 22, a learning unit 23, a storage 24, a conspicuity map calculator 25, a recovery unit 26, and an output unit 27.

The image input unit 20 receives image data from the fisheye camera 10. The captured image data is transmitted to the human-body detector 21 and the tracker 22.

Human-Body Detector

The human-body detector 21 detects human bodies from the fisheye image using an algorithm for detecting human bodies. Each human body detected by the human-body detector 21 serves as a target of a tracking process performed by the tracker 22. The human-body detector 21 may detect a person that newly appears in an image, and exclude the vicinity of the position of the person serving as the track target from the target of detection. The human-body detector 21 may detect a person throughout the image at regular time intervals or frame intervals. The tracker 22 may then perform the tracking process.

Tracker

The tracker 22 tracks a track target in a moving image, and identifies the position of the person serving as the track target in the current frame image. The tracker 22 first determines an area including the position detected by the human-body detector 21 as a target area to identify an object position having features similar to those of a person detected in the target area. With the vicinity of the position identified by the tracker 22 in the previous frame image determined as a target area, the position of the person serving as the track target is then identified in the current frame image.

The tracker 22 includes a feature amount extractor 101, a response map generator 102, and a loss determiner 103.

The feature amount extractor 101 extracts image feature amounts from the target area. The feature amount extractor 101 extracts, as image feature amounts, either one or both of the feature amounts for the shape and the color. Examples of the feature amount for the shape include a histogram of oriented gradient (HOG). Examples of the feature amount for the color include a color histogram and a feature amount of color names.

The response map generator 102 generates a response map (likelihood map) indicating the likelihood of a track target being at each position of the target area using the feature amounts extracted from the input image and a correlation filter stored in the storage 24.

The loss determiner 103 determines whether a track is lost. The loss determiner 103 determines that a track is lost when, for example, the maximum likelihood in the response map is less than a threshold TH1. The threshold TH1 may be set as appropriate in accordance with a system request. When the track target is estimated to have moved out of a photographed range, the loss determiner 103 may determine framing out instead of determining that a track is lost.

When the maximum likelihood in the response map is greater than the threshold TH1, the tracker 22 determines that a human body as a track target is at the position with the maximum likelihood.

Instead of or in addition to the evaluation based on the shape feature using the correlation filter, the tracker 22 may perform tracking through evaluation based on the color feature. For example, the tracker 22 may generate a foreground likelihood map based on the learned color feature, and obtain the position of the track target based on this map. In some embodiments, the tracker 22 may obtain the position of the track target based on a map obtained by synthesizing a correlation filter response map and a foreground likelihood map. Examples of the feature amount of color information include a color histogram and a feature amount of color names.

Learning Unit

The learning unit 23 learns the feature of a human body as a track target from an image of the human body detected by the human-body detector 21 or identified by the tracker 22, and stores the learning result into the storage 24. In this case, the learning unit 23 obtains a correlation filter for evaluation based on the shape feature. The learning unit 23 learns per frame, and reflects the learning result obtained from the current frame on the past learning result with a predetermined coefficient to update the learning result. When the evaluation based on the color feature is performed in the tracking process, the learning unit 23 may use the feature amount of color information such as a color histogram or a feature amount of color names.

Storage

The storage 24 stores the learning result of the learning unit 23. The storage 24 also stores hyperparameters for the learning process and the tracking process such as feature amounts (HOG or color histogram) to be used, parameters of each feature amount, and a learning coefficient.

The storage 24 also stores, for each site, information indicating a track target area image in an initial tracking frame image, and stores the conspicuous site.

In the present embodiment, a human body is divided into three sites including the head, the upper half, and the lower half. Thus, the storage 24 stores information indicating area images of the head, the upper half, and the lower half. The information indicating the area images may be the area images, or the image feature amounts (e.g., color histograms) obtained from the area images of the sites. The process of dividing an image of a human body into area images of respective sites may be performed by a known image segmentation process. In some embodiments, a human-body ratio may be set tentatively, and the image may be segmented for each site at the set ratio.

The conspicuous site is a site of a track target with a maximum value in the conspicuity map for an initial tracking frame image. The conspicuity map may be calculated by the conspicuity map calculator 25. The conspicuous site can be determined by comparing the position of the maximum value in the conspicuity map with the area of each site in an input image. The storage 24 stores the obtained conspicuous site. In the present embodiment, the storage 24 stores one of the head, the upper half, and the lower half as the conspicuous site.

In the present embodiment, the initial tracking frame image indicates a second frame image after the start of tracking, or in other words, a frame image processed by the tracker 22 first. A frame has less noise when less time passes after the start of tracking. A frame that is to initially change in brightness over time to improve conspicuity is the second frame. Thus, the second frame image is used as the initial tracking frame image. The above information may be obtained and stored from a first frame image, or in other words, a frame image in which a human body is detected by the human-body detector 21, or a third or subsequent frame image. The initial tracking frame image corresponds to a first frame image of a plurality of frame images included in the moving image to be processed in an aspect of the present invention.

The storage 24 stores, in a manner associated with one another, each position on an image captured by the fisheye camera 10, when one site of a human body is at each position on the image, the position and the size of another site, and the visible rate of each of the sites. The above information is herein referred to as site information. The table that stores the site information is herein referred to as a site information table.

FIG. 3 shows a site information table 300. As shown in the figure, the site information table 300 stores the center position, the size, and the visible rate for each of the head, the upper half, and the lower half. The center position is, for example, the center of the site indicated by a rectangular area. The size includes the vertical and horizontal dimensions of the rectangular area. The visible rate indicates the rate at which each site is visible with respect to the area rate of a human body in a front view determined as 100%.

The site information table 300 includes one record in FIG. 3, but actually includes records many positions in an image. When any site (one site) of the head, the upper half, and the lower half is at a specific position, the position of sites other sites, the size of each site, and the visible rate of each of the sites can be obtained by referring to the site information table 300.

Methods for forming the site information table 300 will be simply described. A first method is for obtaining the center position, the size, and the visible rate of each of the sites by analyzing images obtained through actual measurement. A second method is for obtaining the center position, the size, and the visible rate of each of the sites through simulation or calculation. For example, the sites of the human body may be modeled into cylinders with different sizes, and the position and the size of each cylinder model photographed by the fisheye camera 10 when the human body is hypothetically at various positions may be obtained. The visible rate is obtained as the rate of the area of a specific site photographed when the cylinder model of the specific site alone is present to the area of the specific site photographed when all the cylinder models are present.

Conspicuity Map Calculator

The conspicuity map calculator 25 calculates a conspicuity map from input images. The conspicuity is an index indicating the degree to receive attention from people and obtained for each partial area or each pixel. The conspicuity can be determined with a known method of mathematically modeling biological vision based on the features such as brightness, a change in brightness over time, a color, and the direction.

Recovery Unit

The recovery unit 26 recovers the track target when the track target is lost. The recovery unit 26 is used to recover from a track loss and estimates the position of the track target from the current frame image through a process different from the process performed by the tracker 22. The recovery unit 26 includes an area estimator 112, a similarity score calculator 113, and a resetter 114. The recovery unit 26 and sub-functional units will be described later in detail with reference to the flowchart, and will be simply described now.

The recovery unit 26 performs a recovery process on a frame image (the current frame image or the second frame image) that is determined to have a track target loss by the loss determiner 103.

The area estimator 112 estimates an area in the current frame image with each site of the track target based on the maximum value position in the conspicuity map for the current frame image and the conspicuous site of the track target. More specifically, the area estimator 112 hypothetically determines that the conspicuous site is at the maximum value position in the conspicuity map, and estimates the areas (the center position and the size) of other sites by referring to the site information table stored in the storage 24. When multiple maximum values are in the conspicuity map, the area estimator 112 estimates the area for each of the maximum value positions.

The similarity score calculator 113 calculates the similarity score between the area estimated by the area estimator 112 and the human-body area in the initial frame. The similarity score calculator 113 calculates the similarity of the area image of each site between the current frame image and the initial frame image, and weights and averages the similarity for each site to calculate a final similarity score. The weight coefficient may be determined based on, for example, whether the site is a conspicuous site or an inconspicuous site, or may be determined in accordance with the visible rate of the site.

When the maximum similarity score is greater than a threshold TH2, the resetter 114 determines that a track target is at the position with the maximum similarity score, and notifies the result to the tracker 22. When the recovery process is successful, the tracker 22 can continue tracking.

Output Unit

The output unit 27 outputs information such as fisheye images, detection results, or tracking results to the external device. For example, the output unit 27 may display the information on a display serving as an external device, transfer the information to a computer serving as the external device, or transmit the information or control signals to a light fixture, an air conditioner, or a FA device serving as the external device.

Hardware Configuration

The human tracking device 1 may be a computer including, for example, a central processing unit (CPU) or a processor, a memory, and a storage. In this case, the configuration shown in FIG. 2 is implemented by loading a program stored in the storage into the memory and by the CPU executing the program. The computer may be a general-purpose computer such as a personal computer, a server computer, a tablet, or a smartphone or a built-in computer such as an onboard computer. In some embodiments, part or all of the configuration in FIG. 2 may be formed from an application-specific integrated circuit (ASIC) or a field-programmable gate array (FPGA). In some embodiments, part or all of the configuration in FIG. 2 may be implemented by cloud computing or distributed computing.

Overall Process

Figure 4:
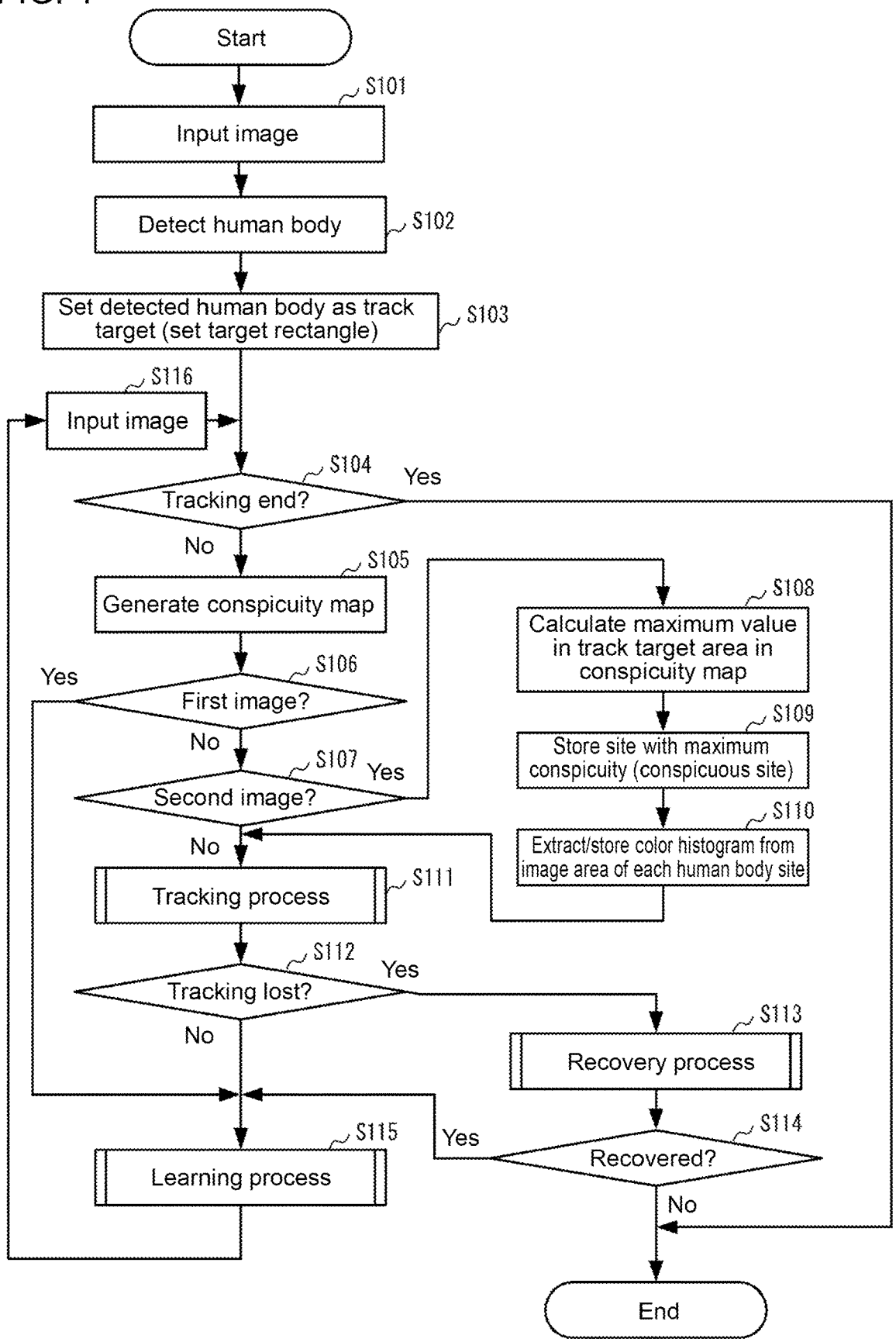
FIG. 4 is a flowchart of an overall process performed by the human tracking device.

FIG. 4 is a flowchart showing an overall process for person tracking performed by the monitoring system 2. The overall procedure of the person tracking process will be described with reference to FIG. 4.

Before the process of the flowchart in FIG. 4 is performed, learning and tracking hyperparameters are set to the human tracking device 1. Example hyperparameters include the feature amounts to be used, parameters of each feature amount, and a learning coefficient. The input hyperparameters are stored in the storage 24.

In step S101, the image input unit 20 inputs one frame of a fisheye image from the fisheye camera 10. A plan development image may be formed by correcting distortion of the fisheye image before performing the subsequent process. However, the monitoring system 2 in the present embodiment uses the distorted fisheye image (without being corrected) for detection or tracking.

In step S102, the human-body detector 21 detects a human body from the input image. In step S103, the tracker 22 sets the detected human-body area as a tracking target area. The target area is a combination of the area with the person serving as the track target and the area surrounding the area, and is an area highly likely with a person serving as the track target. The target area may also be referred to as an area to be processed by the tracker 22. The initial position of the track target person is detected by the human-body detector 21 in the present embodiment, but may be detected by another method such as using an input from a user.

The processing in steps S104 to S116 is then repeated. When an end condition is satisfied in the end determination in step S104, the processing ends. The end condition may be, for example, the track target person being framing out or an end of a moving image.

In step S105, the conspicuity map calculator 25 generates a conspicuity map from the input image. The generated conspicuity map is stored in the storage 24.

In step S106, the determination is performed as to whether the current frame is a first image. The first image is a frame image with an initial position of the track target person, or typically, with the track target person detected by the human-body detector 21. When the current frame is the first image (Yes in S106), the processing advances to step S115. When the current frame is not the first image (No in S106), the processing advances to step S107.

In step S107, the determination is performed as to whether the current frame is a second image. The second image is a frame image subsequent to the frame image with the initial position of the track target person. When the current frame is the second image (Yes in S107), the processing advances to step S108. When the current frame is not the second image (No in S107), the processing advances to step S111.

In step S108, the learning unit 23 obtains the position with the maximum conspicuity in the target area in the conspicuity map.

In step S109, the learning unit 23 determines the site of the track target in which the position with the maximum conspicuity is located, and stores the site as a conspicuous site into the storage 24. When the target area is not divided into sites (not segmented), the human tracking device 1 performs segmentation in step S109.

In step S110, the learning unit 23 calculates the color histogram for each site of the track target human body, and stores the color histogram into the storage 24. The color histogram is stored in this case. Instead, other image feature amounts may be calculated and stored when the similarity of the area image can be compared between the frames.

In step S111, the tracker 22 performs the tracking process. Although the tracking process will be described in detail later with reference to FIG. 6, the tracking process is to apply a correlation filter to an input image and determine a target area at the position with a maximum response (likelihood).

In step S112, the loss determiner 103 determines whether a track is lost. A track loss can be detected when the maximum response (likelihood) is less than the threshold TH1. When a track is lost (Yes in S112), the processing advances to step S113. When a track is not lost (No in S112), the processing advances to step S115.

In step S113, the recovery unit 26 performs a recovery process. The recovery process will be described in detail later with reference to FIG. 7 and other figures.

In step S114, the determination is performed as to whether the recovery process has been successful. When the recovery has been successful (Yes in S114), the processing advances to step S115 to continue the tracking process. When the recovery has been unsuccessful (No in S114), the tracking process ends.

In step S115, the learning unit 23 performs a learning process of a correlation filter. The learning process will be described in detail later with reference to FIG. 5.

In step S116, the image input unit 20 inputs a next frame of the fisheye image from the fisheye camera 10. After step S116, the processing returns to step S104, and the above process is repeated until the tracking end condition is satisfied.

Thus, the position of the track target person in the tracking process S111 is identified for each frame to perform tracking. The tracking process in the present embodiment includes a recovery process using information stored in the initial frame when a track is lost.

Learning Process

Figure 5:
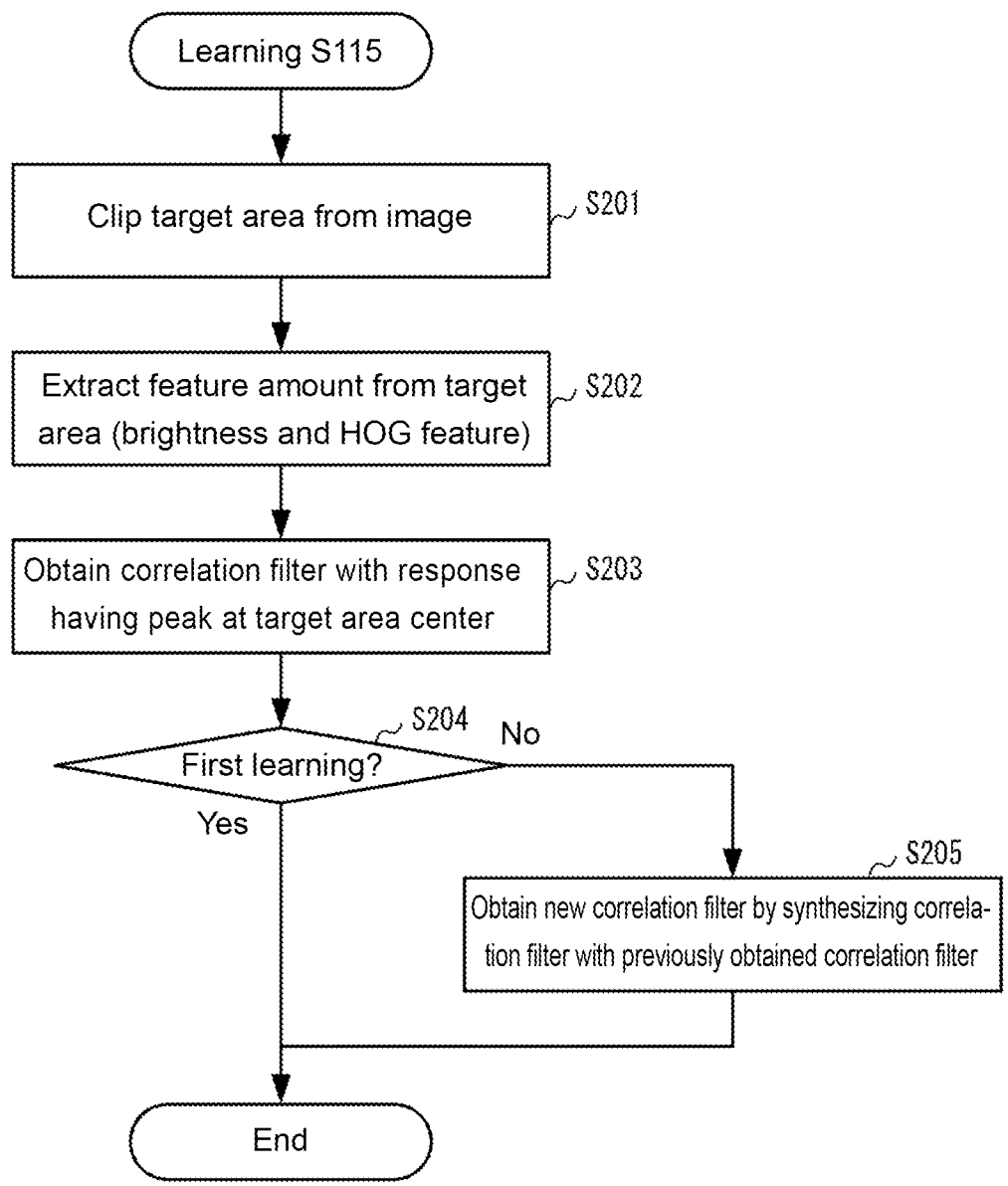
FIG. 5 is a flowchart of a learning process.

FIG. 5 is a flowchart of the detailed learning process in step S115. The learning process will be described with reference to FIG. 5 below.

The learning unit 23 first clips a target area from the current frame image (S201). The target area includes a foreground area and a background area of the track target person. The foreground area is an area with the track target person. The background area is an area without the track target person. The size of the background area is determined in accordance with the size of the foreground area. For example, the size of the background area is determined to satisfy that the size of the foreground area is at a predetermined ratio (e.g., 1/3) of the entire size of the target area. The target area is updated at the end of the tracking process to have its center at the position of the track target person (step S304 in FIG. 6). Thus, the center of the target area matches the center position of the track target person.

The learning unit 23 obtains a brightness feature amount and a HOG feature amount as the image feature amounts of the target area (S202). The HOG feature amount is a feature amount of a luminance gradient direction of a local area in a histogram form, and is used as a feature amount indicating the shape or the profile of an object. Although the HOG feature amount is used as the image feature amount in this example, another feature amount indicating the shape or the profile of the object may be used, such as a feature amount obtained by local binary pattern (LBP), a scale-invariant feature transform (SIFT), or a speeded-up robust features (SURF). Instead of the brightness feature amount, a luminance feature amount may be used. When the brightness feature amount and the HOG feature amount have been obtained in the tracking process, they are not obtained again in this process. These feature amounts are obtained in an image format. Thus, these feature amounts are herein also referred to as feature amount images.

The learning unit 23 obtains a correlation filter having a response that has a peak at the center of the target area (S203). More specifically, after extracting the HOG feature amount, the learning unit 23 obtains a filter that has a response closest to an intended response that has a peak at the center alone with respect to the correlation of the feature amount to obtain a correlation filter. When a method for calculating a correlation filter in a Fourier space is used as a tracking algorithm of a correlation filter model, the feature amount images may be multiplied by a window function.

When the current learning is the first learning (Yes in S204), the correlation filter generated in step S203 is directly stored into the storage 24. When the current learning is the second or subsequent learning (No in S204), the processing advances to step S205. In step S205, the learning unit 23 synthesizes the previously obtained correlation filter (correlation filter stored in the storage 24) and the correlation filter currently obtained in step S203 to obtain a new correlation filter, and stores the new correlation filter into the storage 24.

Tracking Process

Figure 6:
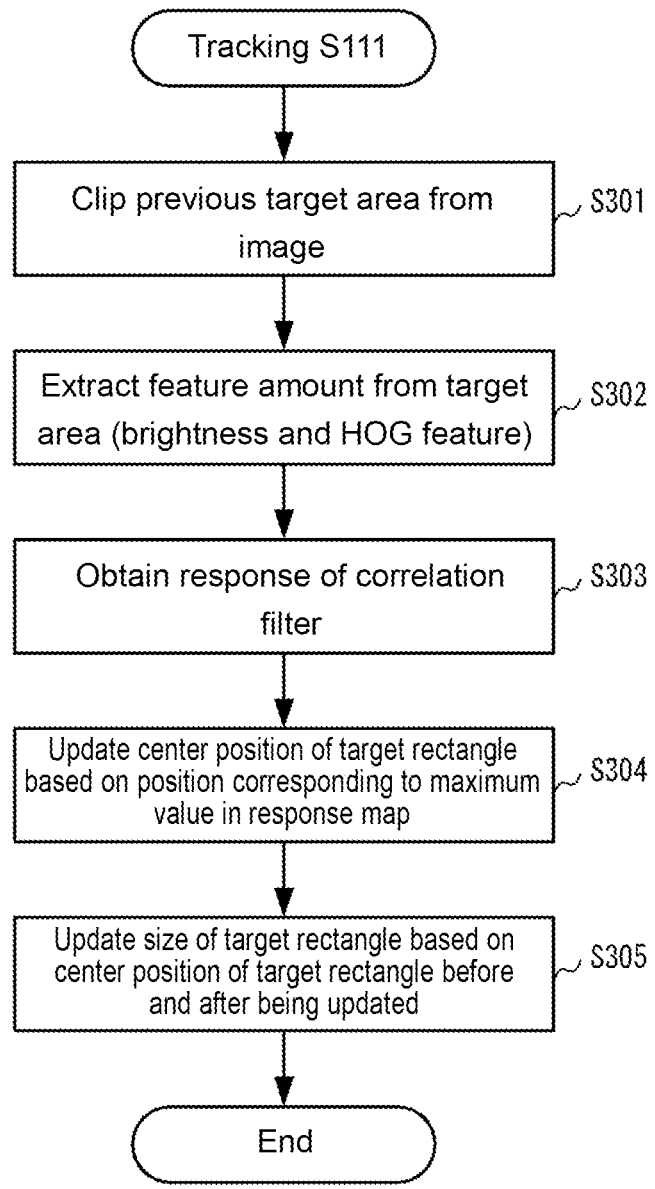
FIG. 6 is a flowchart of a tracking process.

FIG. 6 is a flowchart of the detailed tracking process in step S111. The tracking process will be described below with reference to FIG. 6.

The tracker 22 clips the previous target area from the current frame image (S301). The center of the target area has been updated in the previous tracking process to match the position of the track target person in the previous frame image.

The feature amount extractor 101 extracts the brightness feature amount and the HOG feature amount as the feature amounts of the target area (S302). These feature amounts are obtained in the image format, and thus herein also referred to as feature amount images. Although the brightness feature amount images have the same resolution as the frame image, the feature amount is obtained for each cell (e.g., per 3×3 pixels) in the HOG feature amount images. Thus, the resolution is lower than in the frame image.

The response map generator 102 obtains a response map (likelihood map) with the HOG feature amount images in the target area and the correlation filter stored in the storage 24 (S303). The tracker 22 updates the position corresponding to the maximum value of the response map as the center position of the subsequent target area (S304). The tracker 22 updates the size of the target area based on the updated center position of the target area (S305). The size update process is performed based on the geometrical relationship based on the location of the fisheye camera 10, the camera viewpoint, the camera parameter, and the position of the person model used to determine the height and the width. The size update process may be performed with a known method for performing scale estimation using an image pyramid.

With the above processing, the tracking process ends, and the target area in the current frame image is obtained. The center of the target area after the tracking process corresponds to the center position of the track target person. The foreground area in the target area corresponds to the area with the track target person (bounding box).

Although one specific example of the tracking process is described above, another algorithm may be used. For example, a response map based on a correlation filter may undergo a correction process to improve the tracking accuracy.

Recovery Process

Figure 7:
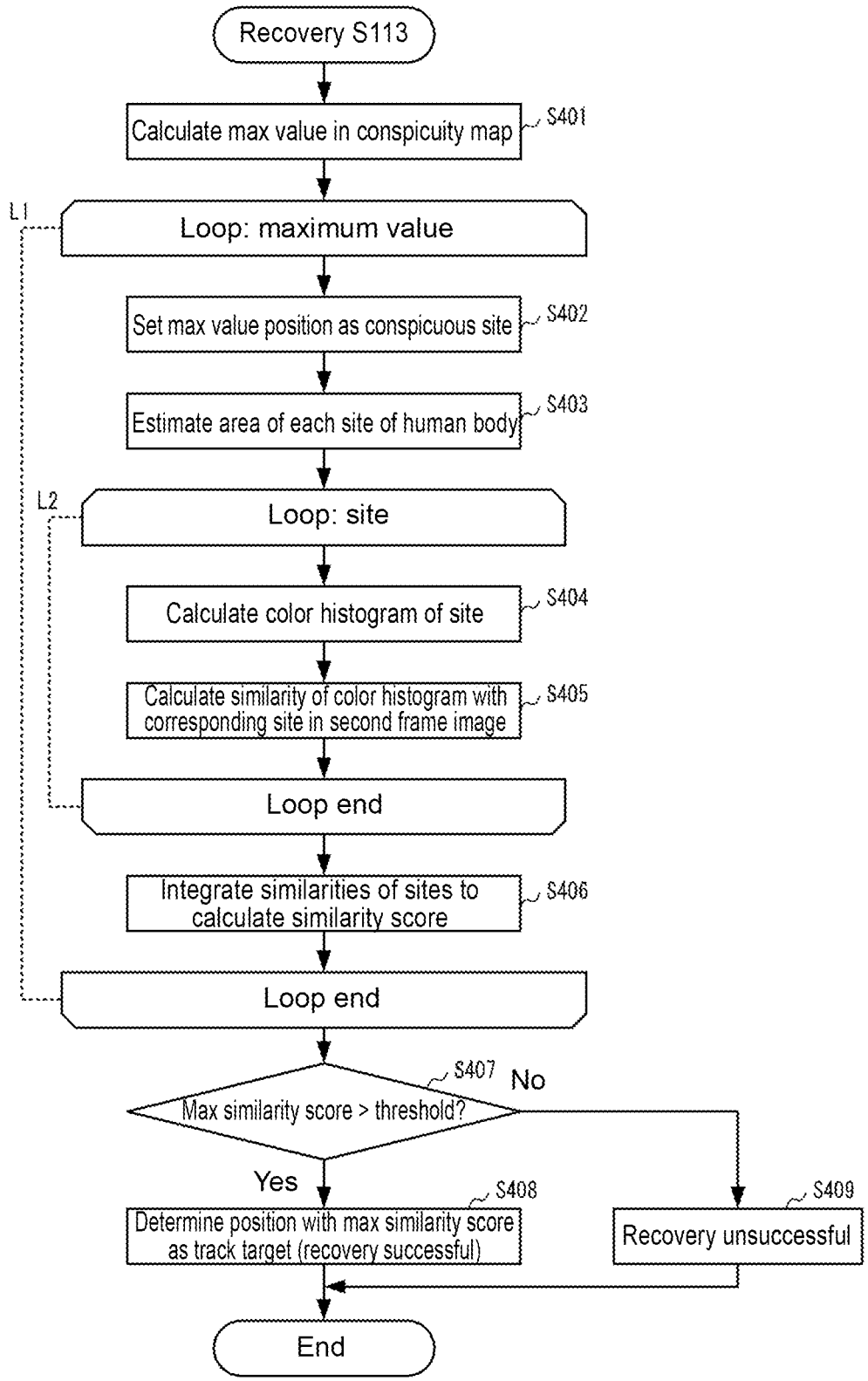
FIG. 7 is a flowchart of a recovery process.

FIG. 7 is a flowchart of the detailed recovery process in step S113. FIG. 8 is a data-flow diagram of the recovery process. FIG. 8 also shows information prestored based on the initial frame. The recovery process will be described below with reference to, for example, FIGS. 7 and 8.

In step S401, the recovery unit 26 obtains a conspicuity map 807 corresponding to a current frame image 806 obtained in step S105 from the storage 24, and obtains the position with a maximum value in the conspicuity map 807.

A loop process L1 includes steps S402 to S406, and is performed for each of the maximum value positions obtained in step S401. In the loop process L1, the recovery unit 26 calculates a similarity score for each maximum value position in the conspicuity map 807 corresponding to the frame image with a track loss.

In step S402, the area estimator 112 sets the maximum value position in the conspicuity map 807 at the position of a conspicuous site 805 in the current frame image. The site corresponding to the conspicuous site 805 is obtained in advance in step S109 based on a conspicuity map 804 corresponding to a second frame image (initial frame image) 801, and is stored into the storage 24.

In step S403, the area estimator 112 estimates the area (the position and the size) of each site of the human body based on the position of the conspicuous site 805. The storage 24 stores a site information table 811 (300) storing the position, the size, and the visible rate of each of the sites of the human body. The area estimator 112 can thus obtain an estimate area 808 of each site based on the position of the conspicuous site 805 and the site information table 811.

With the processing in steps S402 and S403, the area estimator 112 can estimate the area with each site of the track target when the conspicuous site is hypothetically at the maximum value position.

The loop process L2 includes steps S404 and S405, and is performed on the estimate area for each site obtained in step S403. In step S404, the similarity score calculator 113 calculates a color histogram 809 from the estimate area 808 of the site. In step S405, the similarity score calculator 113 calculates, for the target site, the similarity between the color histogram 809 of the current frame and a color histogram 803 of the second frame image (initial frame image) 801. The color histogram 803 of the second frame image is obtained in advance in step S110, and is stored into the storage 24. The calculated similarity indicates the similarity between the initial frame image and the current frame image for each site.

When the similarity for all the sites is calculated in the loop process L2, the similarity score calculator 113 integrates the similarity for each site to calculate a similarity score 810 in step S406. In the present embodiment, the similarity score calculator 113 determines, as a final similarity score, the weighted mean value of the similarity for each site obtained by using a weighting coefficient determined depending on the visible rate of each of the sites and whether the site corresponds to the conspicuous site.

More specifically, the similarity score calculator 113 calculates the similarity score based on Formula 1 below.

$$\text{SCORE} = \frac{\sum_{i}^{N} \frac{(WV_i \times WS_i \times s_i)}{(WV_{i_{max}} \times WS_{i_{max}} \times s_{i_{max}})}}{N} \tag{1}$$

In Formula 1, SCORE is the similarity score, N is the number of sites, i is an index indicating a site, $s_i$ is the similarity of the site i, $WV_i$ is a weighting coefficient based on the visible rate of the site i, $WS_i$ is a weighting coefficient based on whether the site i is a conspicuous site, $WV_{i_{max}}$ is a maximum possible value of $WV_i$, $WS_{i_{max}}$ is a maximum possible value of $WS_i$, and $s_{i_{max}}$ is a maximum possible value of $s_i$.

In the present embodiment, the weighting coefficient $WV_i$ matches the visible rate of the site i. The visible rate of each of the sites can be determined by referring to the site information table 811 (300). However, the weighting coefficient $WV_i$ may be different from the visible rate of the site i, and may be determined in accordance with the visible rate of the site i.

When the site i corresponds to the conspicuous site, the weighting coefficient $WS_i$ is a fixed value A, and when the site i corresponds to the inconspicuous site, the weighting coefficient $WS_i$ is (1−A)/(N−1). The weighting coefficient $WS_i$ for the conspicuous site may be greater than the weighting coefficient $WS_i$ for the inconspicuous site. Thus, the fixed value A may be greater than 1/N. For example, when three sites are included and A=0.7, the weighting coefficient $WS_i$ for the conspicuous site is 0.7, and the weighting coefficient $WS_i$ for the inconspicuous site is 0.15.

When the processing from steps S402 to S406 ends for each maximum value in the conspicuity map, the processing advances to step S407.

In step S407, the resetter 114 determines whether the maximum similarity score obtained for the respective maximum values is greater than the threshold TH2. When the maximum similarity score is greater than the threshold TH2 (Yes in S407), the processing advances to step S408. When the maximum similarity score is not greater than the threshold TH2 (No in S407), the processing advances to step S409.

In step S408, the resetter 114 determines that the conspicuous site of the track target person is at the position with the maximum similarity score among the maximum value positions in the conspicuity map. The resetter 114 notifies the success in recovery from the track loss and the position of the track target person to the tracker 22, and ends the process. The track target position provided by the resetter 114 to the tracker may be the position of the conspicuous site, or other positions obtained from the position of the conspicuous site. Examples of the other positions include the center position of the track target person. The center position is obtained as the center of an area including areas of all the sites including the conspicuous site and the inconspicuous site.

In step S409, the resetter 114 notifies the failure in recovery from the track loss to the tracker 22, and ends the processing.

OPERATION EXAMPLES

Figure 9A:
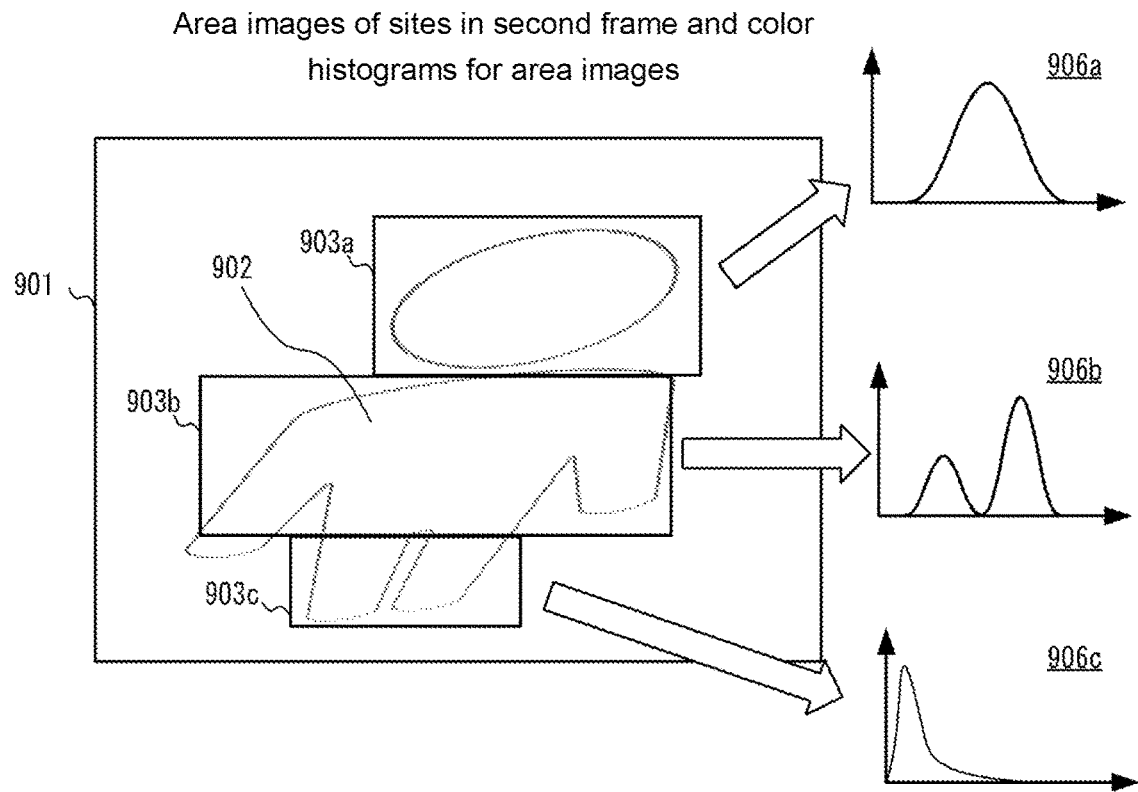
FIG. 9A is a diagram describing color histograms for area images of sites in an initial frame (second frame)
Figure 9B:
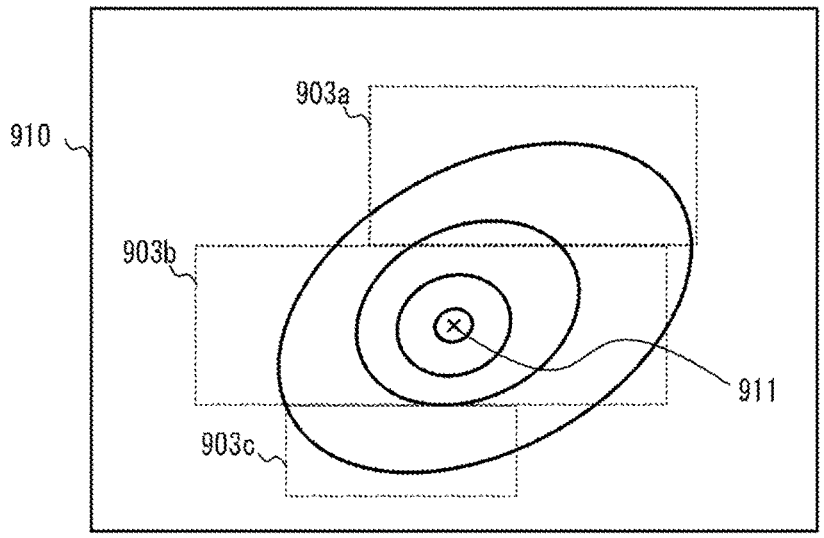
FIG. 9B is a diagram of a conspicuity map for the initial frame (second frame).
Figure 10A:
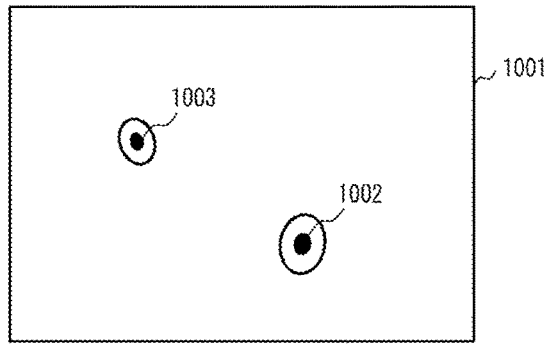
FIG. 10A is a diagram of a conspicuity map for a frame with a track loss (N-th frame)
Figure 10B:
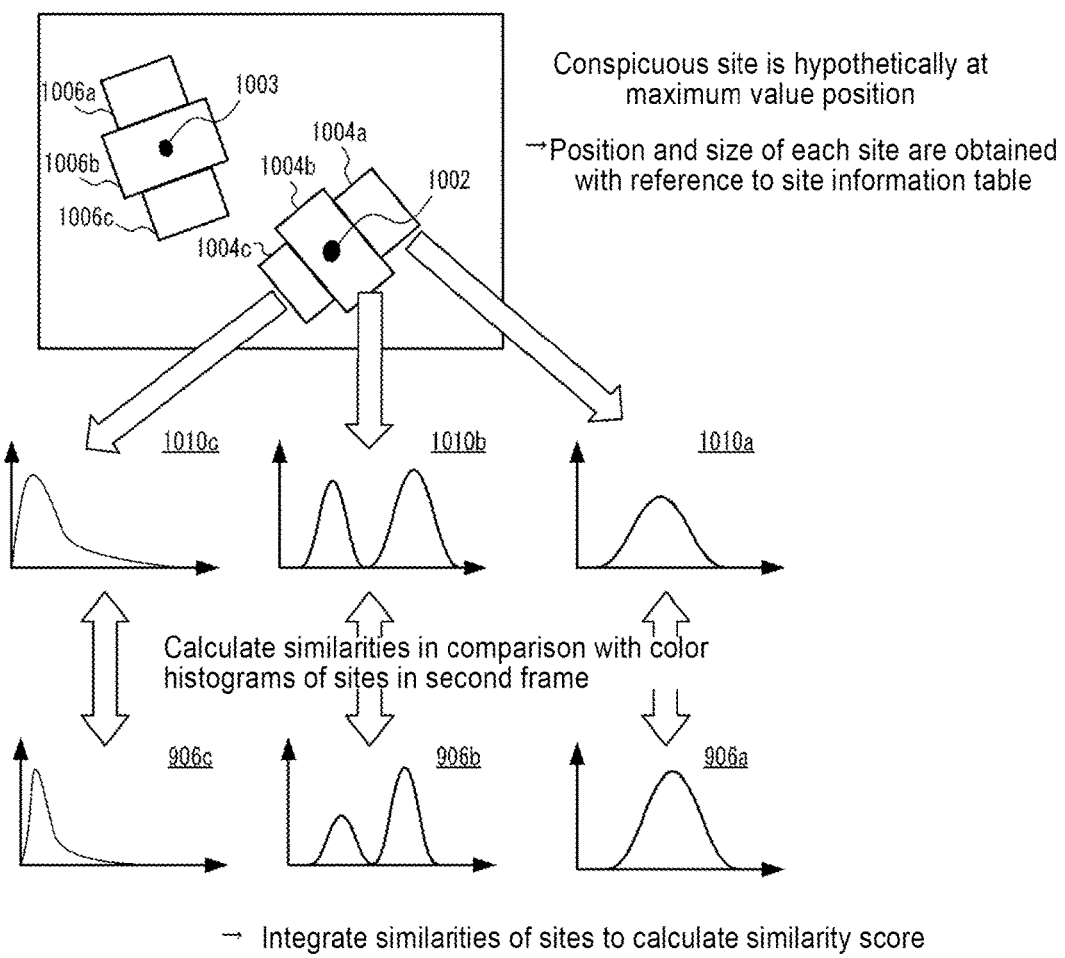
FIG. 10B is a diagram describing a method for obtaining a similarity score for each maximum value position in the frame with a track loss (N-th frame).

With reference to FIGS. 9A, 9B, 10A, and 10B, the operation of the recovery process will be described using specific examples. FIGS. 9A and 9B are diagrams describing the information used in the initial stage (the second frame in this example) after the start of tracking. FIGS. 10A and 10B are diagrams describing the process performed when a track is lost.

FIG. 9A shows an image 901 of the second frame (initial frame) with the person as the track target partially enlarged. The image 901 shows a human body 902 serving as a track target. The learning unit 23 divides the human body 902 into three sites, or a head 903a, an upper half 903b, and a lower half 903c through the segmentation process. In this figure, the area of each site is displayed in a rectangle, but may be displayed in a shape other than a rectangle. The learning unit 23 calculates color histograms 906a, 906b, and 906c corresponding to a head 903a, an upper half 903b, and a lower half 903c, and stores the color histograms 906a, 906b, and 906c into the storage 24.

FIG. 9B shows a conspicuity map 910 obtained from the second frame image. The conspicuity map 910 has a size corresponding to the entire second frame image, but FIG. 9B simply shows the portion corresponding to the image 901. The learning unit 23 determines the conspicuous site of the human body 902 based on the site of the human body 902 with a maximum value position 911 in the conspicuity map 910, and stores the information on the conspicuous site into the storage 24. In this example, the maximum value position 911 is located in the upper half 903b. Thus, the conspicuous site is determined as the upper half.

The above information is calculated at the initial stage (the second frame in this example) after the start of tracking, and is stored into the storage 24. The process for recovering from a track loss will now be described.

FIG. 10A shows a conspicuity map 1001 obtained from an N-th frame image. The N-th frame is a frame image with a track loss. In this example, the conspicuity map 1001 has two maximum values 1002 and 1003.

The recovery unit 26 (area estimator 112) estimates the area of each site when the conspicuous site (the upper half in this example) is hypothetically at the maximum values 1002 and 1003. The recovery unit 26 can obtain the position and the size of each site by referring to the site information table 300. In this example, a head area 1004a, an upper half area 1004b, and a lower half area 1004c are obtained for the maximum value 1002. Similarly, a head area 1005a, an upper half area 1005b, and a lower half area 1005c are obtained for the maximum value 1003.

The similarity score calculator 113 calculates a color histogram from the areas of each site. For example, color histograms 1010a to 1010c are obtained for the areas 1004a to 1004c of each site. The similarity score calculator 113 then compares the color histograms 1010a to 1010c for the areas of each site with the color histograms 906a to 906c obtained from the second frame image, and calculates the similarities $s_i$.

The similarity score calculator 113 integrates these similarities $s_i$ using a weighting coefficient determined based on the visible rate of each of the sites and based on whether the site is the conspicuous site to calculate a final similarity score. The similarity score is obtained for each of the maximum values 1002 and 1003 in the conspicuity map.

The resetter 114 determines that the track target is at the maximum value position with a maximum similarity score. When the maximum similarity score is less than the threshold TH2, the resetter 114 determines a failure in recovery. The resetter 114 resets the target area by determining the center position of the entire area of each site of the human body as the center position of the track target. The resetter 114 resets the size of the target area in accordance with the entire area of each site of the human body.

Advantageous Effects of Present Embodiment

The human tracking device according to the present embodiment can perform an accurate recovery from a tracking failure. In the present embodiment, information as to any site corresponding to the conspicuous site and the color histogram of the area of each site are stored based on the initial frame. When the person serving as the track target moves and changes its position in the image, the relative position between the person and the fisheye camera 10 changes. Thus, the position on the image may change or the shape may be distorted. However, the site corresponding to the conspicuous site may remain unchanged. Thus, in the frame with a track loss, the maximum value position in the conspicuity map can be used as a candidate position of the conspicuous site of the track target. When a specific site is at a specific position on the image, the positions of other sites, and the size and the visible rate of each of the sites can be obtained in advance. Thus, the area of each site when the conspicuous site is hypothetically at the maximum value position in the conspicuity map is estimated, and the similarities between the color histograms of the current frame and the initial frame are obtained and integrated to calculate the similarity score. Using the maximum value in the conspicuity map as the position of the conspicuous site and calculating the similarity based on the color histogram allow a robust recovery from a change in shape. The weighting coefficient for each site is determined depending on whether the site is the conspicuous site or the inconspicuous site or depending on the visible rate of the site at the integration of the similarities. This is because the similarity score is to be calculated with the conspicuous site being in more focus than the inconspicuous site and with the site with a greater visible rate being in more focus. The weighting based on the visible rate is robust against occlusion. In the present embodiment, the recovery process performed with the above process allows an accurate recovery.

Others

The above embodiment is a mere example structure of the present invention. The present invention is not limited to the specific embodiment and may be modified in various manners within the technical scope of the invention.

In the above embodiment, the tracker 22 performs the tracking process using the correlation filter, but may perform tracking with another algorithm. For example, tracking may be performed by using a deep learning model such as a convolutional neural network (CNN), a recurrent neural network (RNN), or a long short-term memory (LSTM), or a pattern recognition model such as a support-vector machine (SVM).

In the above embodiment, a fisheye image is processed without being developed into a plan, but the fisheye image may be processed after being developed into a plan image, or an image captured by a normal camera may be processed. In the embodiment, as to the camera viewpoint, the fisheye camera is installed to have its optical axis extending vertically downward, but may have its optical axis inclined with respect to the vertical direction.

Although the conspicuous site and the color histogram of each site are obtained from the second frame (S108 to S110 in FIG. 4), these pieces of information may be obtained from any other frame image. However, a frame closer to the start of tracking has less noise and is thus usable. Thus, the information may be obtained from a frame at the start of tracking (first frame) or a third or subsequent frame.

The color histogram is used to calculate the similarity of the recovery process, but the similarity may be determined based on information other than the color histogram. However, for a largely distorted image such as an image captured by a fisheye camera, the feature amount robust against distortion, such as the color histogram or the luminance histogram, may be used.

In the present embodiment, when the similarities of the respective sites are integrated to calculate the similarity score (S406 in FIG. 7), a value obtained by multiplying the weighting coefficient $WS_i$ corresponding to whether the site is the conspicuous site by the weighting coefficient $WV_i$ corresponding to the visible rate is used as a weighting coefficient. However, for example, the weighting coefficient to be used may be determined based on these two weighting coefficients $WS_i$ and $WV_i$ using other methods such as an addition. In some embodiments, the weighting coefficient may be determined based on one of the weighting coefficients $WS_i$ and $WV_i$, or determined using information other than the weighting coefficients $WS_i$ and $WV_i$. Instead of a weighted mean, the similarity score may be calculated with an arithmetic mean.

In the present embodiment, the position of a site other than a specific site when the specific site is at a specific position in an image, and the size and the visible rate of each of the sites are obtained with reference to a site information table prestored, but may be obtained through calculation as appropriate. The calculation method is the same as that for obtaining these items in advance described in the above embodiment and thus will not be described.

In the present embodiment, the tracker 22 tracks a person detected by the human-body detector 21. Instead, a user (a person) may specify a track target, and the tracker 22 may track the specified target.

APPENDIXES

1. An object tracking device (1), comprising:
a storage (24);
a tracker (22) configured to track an object in a moving image; and
a recovery unit (26) configured to recover the object in response to the object being lost,
wherein the storage (24) stores, for each of sites of the object, information (803) indicating an area image of the object in a first frame image (801) of a plurality of frame images included in the moving image, and stores a site (805) of the object with a maximum value in a conspicuity map (804) for the first frame image (801), and
in response to the object being lost, for each maximum value position in a conspicuity map (807) for a second frame image (806) in which the object is lost, the recovery unit (26) estimates an area (808) with each of the sites of the object when the site of the object with the maximum value in the first frame image is hypothetically at the maximum value position and (2) calculates a similarity score (810) based on a similarity between the area image of each of the sites in the first frame image and the area image of each of the sites in the second frame image, and
determines that the object is at a maximum value position in the second frame image with a maximum similarity score.

2. A track loss recovery method (S113) implementable with an object tracking device (1) in response to an object to be tracked being lost, the method comprising:
storing (S110), for each of sites of the object, information (803) indicating an area image of the object in a first frame image (801) of a plurality of frame images included in a moving image, and storing (S108 and S109) a site (805) of the object with a maximum value in a conspicuity map (804) for the first frame image (801);
in response to the object being lost, for each maximum value position in a conspicuity map (807) for a second frame image (806) in which the object is lost, (1) estimating (S402 and S403) an area (808) with each of the sites of the object when the site of the object with the maximum value in the first frame image is hypothetically at the maximum value position, and (2) calculating (S404 to S406) a similarity score based on a similarity between the area image for each of the sites in the first frame image and the area image for each of the sites in the second frame image; and
determining (S408) that the object is at a maximum value position in the second frame image with a maximum similarity score.

REFERENCE SIGNS LIST

1 human tracking device
2 monitoring system
10 fisheye camera
track target area
12 ceiling
13 persons

The invention claimed is:
1. An object tracking device, comprising:
a storage;
a tracker configured to track an object in a moving image; and
a recovery unit configured to recover the object in response to the object being lost,
wherein the storage stores, for each of sites of the object, information indicating an area image of the object in a first frame image of a plurality of frame images included in the moving image, and stores a site of the object with a maximum value in a conspicuity map for the first frame image, and
in response to the object being lost, for each maximum value position in a conspicuity map for a second frame image in which the object is lost, the recovery unit (1) estimates an area with each of the sites of the object when the site of the object with the maximum value in the first frame image is hypothetically at the maximum value position and (2) calculates a similarity score based on a similarity between the area image of each of the sites in the first frame image and the area image of each of the sites in the second frame image, and
determines that the object is at a maximum value position in the second frame image with a maximum similarity score.

2. The object tracking device according to claim 1, wherein
the recovery unit calculates a similarity of an image feature amount between the area image for each of the sites in the first frame image and the area image for each of the sites in the second frame image, and integrates the similarities to calculate the similarity score.

3. The object tracking device according to claim 2, wherein
the recovery unit integrates the similarities to calculate the similarity score using a weight corresponding to a visible rate of each of the sites in the second frame image.

4. The object tracking device according to claim 2, wherein
the recovery unit integrates the similarities to calculate the similarity score using weights different between the site of the object with the maximum value in the conspicuity map for the first frame image and another site.

5. The object tracking device according to claim 2, wherein
the recovery unit calculates the similarity score in accordance with Formula 1, $$\text{SCORE} = \frac{\sum_i^N \frac{(WV_i \times WS_i \times s_i)}{(WV_{i_{max}} \times WS_{i_{max}} \times s_{i_{max}})}}{N} \quad (1)$$

where SCORE is the similarity score, N is a number of sites, i is an index indicating a site, $s_i$ is a similarity of the site i, $WV_i$ is a weighting coefficient based on a visible rate of the site i, $WS_i$ is a weighting coefficient based on whether the site i is a conspicuous site, $WV_{i_{max}}$ is a maximum possible value of $WV_i$, $WS_{i_{max}}$ is a maximum possible value of $WS_i$, and $s_{i_{max}}$ is a maximum possible value of $s_i$.

6. The object tracking device according to claim 1, wherein
the storage further stores, in a manner associated with each other, each position on an image and, when one of the sites of the object is at the position on the image, a position with another of the sites, and
the recovery unit estimates an area in the second frame image with each of the sites of the object based on the maximum value position in the second frame image, the site of the object with the maximum value in the conspicuity map for the first frame image, and the storage.

7. The object tracking device according to claim 6, wherein
the storage stores, for each position on the image, a visible rate for each site of the object.

8. The object tracking device according to claim 1, wherein
the first frame image is a frame image at a start of tracking the object or a frame image subsequent to the frame image at the start.

9. The object tracking device according to claim 1, further comprising:
a learning unit configured to learn a correlation filter based on an image of an area determined to include the object,
wherein the tracker determines that the object is at a position with a highest index calculated using the correlation filter.

10. The object tracking device according to claim 9, wherein
the tracker determines that the object is lost when a maximum value of the index calculated using the correlation filter is less than or equal to a threshold.

11. The object tracking device according to claim 1, further comprising:
an imaging unit configured to capture the moving image.

12. The object tracking device according to claim 11, wherein
the imaging unit includes a fisheye camera.

13. A track loss recovery method implementable with an object tracking device in response to an object to be tracked being lost, the method comprising:
storing, for each of sites of the object, information indicating an area image of the object in a first frame image of a plurality of frame images included in a moving image, and storing a site of the object with a maximum value in a conspicuity map for the first frame image;
in response to the object being lost, for each maximum value position in a conspicuity map for a second frame image in which the object is lost, (1) estimating an area with each of the sites of the object when the site of the object with the maximum value in the first frame image is hypothetically at the maximum value position, and (2) calculating a similarity score based on a similarity between the area image for each of the sites in the first frame image and the area image for each of the sites in the second frame image; and
determining that the object is at a maximum value position in the second frame image with a maximum similarity score.

14. A non-transitory computer-readable medium storing a program for causing a computer to perform:
storing, for each of sites of the object, information indicating an area image of the object in a first frame image of a plurality of frame images included in a moving image, and storing a site of the object with a maximum value in a conspicuity map for the first frame image;
in response to the object being lost, for each maximum value position in a conspicuity map for a second frame image in which the object is lost, (1) estimating an area with each of the sites of the object when the site of the object with the maximum value in the first frame image is hypothetically at the maximum value position, and (2) calculating a similarity score based on a similarity between the area image for each of the sites in the first frame image and the area image for each of the sites in the second frame image; and
determining that the object is at a maximum value position in the second frame image with a maximum similarity score.

* * * * *